United States Patent [19]

Chandler, Jr.

[11] 3,774,051

[45] Nov. 20, 1973

[54] SOLID STATE CIRCUITS FOR AND METHOD OF SIMULATING RELAY LOGIC

[75] Inventor: Robert F. Chandler, Jr., Roanoke, Va.

[73] Assignee: General Electric Company, Salem, Va.

[22] Filed: Oct. 30, 1972

[21] Appl. No.: 302,356

[52] U.S. Cl. ................................ 307/203, 307/208
[51] Int. Cl. ........................................ H03k 19/12
[58] Field of Search .................... 307/203, 208, 218, 307/293

[56] References Cited

UNITED STATES PATENTS 3,512,865 5/1970 Chang ................................ 307/203
3,626,202 12/1971 Pound ................................ 307/208

*Primary Examiner*—John W. Huckert
*Assistant Examiner*—Ro E. Hart
*Attorney*—Arnold E. Renner et al.

[57] ABSTRACT

Logic circuits adapted to be connected in prescribed configurations are provided to form solid-state logic systems whereby the circuits directly replace and simulate relay coils and contacts to systematically generate signals representative of the operation of relays.

8 Claims, 2 Drawing Figures

SOLID STATE CIRCUITS FOR AND METHOD OF SIMULATING RELAY LOGIC

BACKGROUND OF THE INVENTION

This invention relates generally to logic systems and more particularly to universal solid-state logic circuits, for use in such systems, adapted to be interconnected to form simulated relay logic systems.

1. Field of the Invention

Various types of processes utilize equipment which lends itself to automatic control. This control is normally effected by a controller or sequencer which monitors status signals from switch contacts, sensors and the like in the equipment and responsively generates control signals for the equipment to start motors, actuate solenoids, etc.

2. Description of the Prior Art

In the past, controllers or sequencers for controlling equipment in a process have normally been fabricated from relays interconnected in prescribed configurations to form relay logic networks for controlling the equipment. In controllers of this type it is customary to provide a logical arrangement of relays, and their associated contacts, which allows the orderly generation of control signals for controlling the equipment.

These logic controllers suffer from several disadvantages in that relays have a relatively short operational life compared to solid-state circuits. As such, the replacement and maintenance costs become high to the user. Additionally, any of the processes today utilize sensors which do not provide signals of sufficient voltage or drive current to activate relays. Also, many present-day processes operate at much higher speeds than in the past; speeds which make the use of slow operating relays impractical.

Further, it is well-known, particularly in complex systems, that the direction of signal flow through relay contacts can be bidirectional. This presents an undesirable condition, because signal sneak paths frequently exist through the relay contacts causing false energization of relays. To eliminate this condition, it is usually necessary to add relays having contacts which isolate or eliminate these sneak paths. In so doing, however, the additional relays increase the cost and add to the complexity of the systems.

Because of these disadvantages, the trend today is to design logic controllers utilizing solid-state logic circuits interconnected in combinational and sequential logic configurations to logically generate the signals necessary to control the process equipment. To the novice user, however, who desires to maintain his own equipment, this type of logic design frequently presents complex problems beyond his comprehension. This is particularly true where the user has, for years, been troubleshooting relay logic controllers, using relay diagrams, and desired to purchase an electronic logic controller for running his process. When this occurs the user must go to the expense of completely reeducating himself to read logic diagrams which portray the logical structure of the controller in unfamiliar terms.

With an increase in the number of processes being converted from relay controllers to electronic logic controllers and with the ever increasing operational speeds of these processes it is desirable to provide solid-state logic circuits for use in logic controllers interconnected in a new and improved prescribed configuration to directly duplicate and replace, on a one to one basis, relay coils and contacts in such a fashion that a user can easily troubleshoot or modify his own equipment with a minimum of reeducation.

SUMMARY OF THE INVENTION

In accordance with the invention claimed, new and improved logic systems are provided using universally adaptable solid-state logic circuits having unidirectional signal flow-through characteristics. The circuits are interconnected in various configurations to form solid-state logic designs which replace relays on a one to one basis to those normally incorporated in a relay system. To realize these designs, the invention utilizes various types of delay circuits for simulating relay coils. Gating circuits, such as AND, OR, NAND and NOR gates, are associated with the delay circuits for simulating relay contacts.

By interconnecting the logic circuits of the invention in prescribed configurations, it is possible to form circuits which simulate relay coils having predetermined time delays representative of the energization and deenergization of relay coils. Further, by connecting the logic circuits in serial and parallel cascade combinations, it is possible to form simulated series and parallel relay contacts which perform logically the same as standard relay logic.

The logic structure of the invention also makes it possible to systematically generate various signals representative of the operation of relay coils and contacts. As such, the invention includes a method of simulating relay logic systems.

The invention may be used in a number of environments, but it finds particular use in the process control field. In this environment the invention provides the capability of designing very flexible systems capable of monitoring high and low voltage level input signals from a variety of processes, generating low voltage level logic signals representative of simulated relay coil and contact operations in response to the input signals and transferring the logic signals directly back to the processes. The logic signals may also be transferred back to the processes via low voltage level to high voltage level signal converters.

In the design of sequential logic controllers, it is desirable to perform certain operations in an orderly sequence at predetermined time intervals. For this purpose, the invention further incorporates digital timer circuits and event counter circuits, which simulate relay coils and contacts, for driving other logic circuits within the controllers or for activating various devices within the processes after a number of events have been counted.

It is, therefore, an object of the present invention to provide improved solid-state circuits for designing simulated relay logic systems having enhanced operating capabilities.

It is another object to provide universal solid-state logic circuits, having unidirectional signal flow-through characteristics, adapted to be interconnected to form simulated relay logic systems, wherein the unidirectional signal flow-through characteristics virtually eliminate the signal sneak paths prevalent through the contacts of relay logic systems.

Still another object is to provide a plurality of universal logic circuits adapted to be interconnected in cascade and parallel to form sequential and combinational simulated relay logic.

Another object of this invention is to provide a method of simulating relay logic systems, using solid-state logic circuits, for generating signals representative of the operation of relay coils and contacts wherein the signals propagate, unidirectionally, through the logic circuits to drive additional logic circuits to generate other signals representative of the operation of relay coils and contacts.

It is still a further object to provide an improved logic controller for controlling a process wherein logic circuits in the controller monitor input signals from the process and logically generate control signals, simulative of relay coils and contacts, for controlling the process.

It is still a further object to provide universal solid-state logic circuits, each including a delay circuit simulative of a relay coil, for applying a delayed signal to associated gating circuits, simulative of relay contacts, in conjunction with other signals, wherein the gating circuits generate output signals representative of the operation of relay contacts.

Still another object is to provide a logic system having universal solid-state logic circuits, for simulating relay logic, including input signal converter circuits for converting high voltage level input signals to low voltage logic level signals for use by the logic circuits and further including output converter circuits for converting the low voltage logic level singals back to high voltage level output signals.

The foregoing and other objects and advantages of the present invention will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawings, in which.

DESCRIPTION OF THE PREFERRED EMBODIMENT

Figure 1:
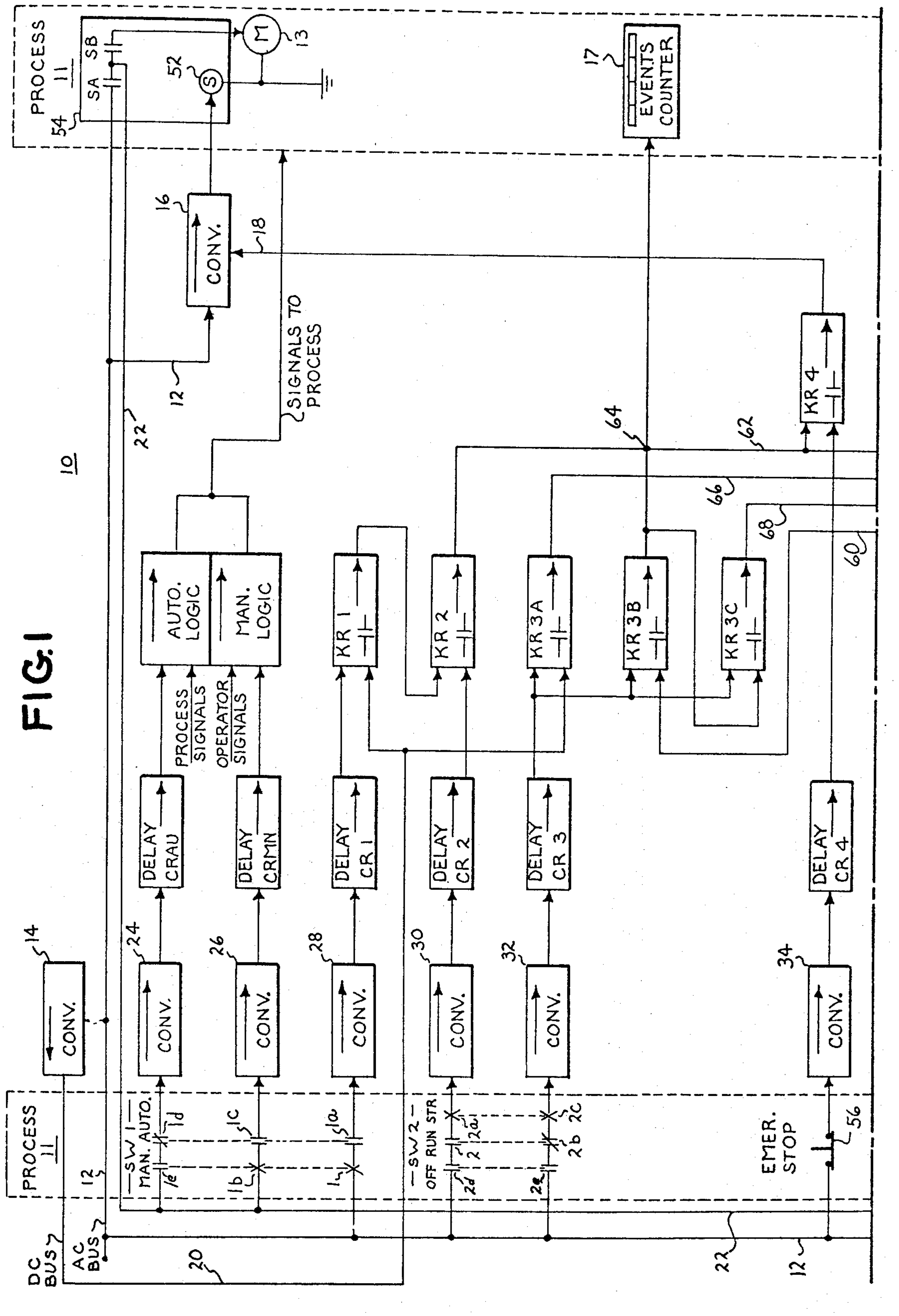
FIGS. 1 and 2, placed bottom edge to top edge respectively, collectively comprise a logic schematic, in block diagram form, of a solid-state relay logic system utilizing the logic circuits of the present invention.
Figure 2:
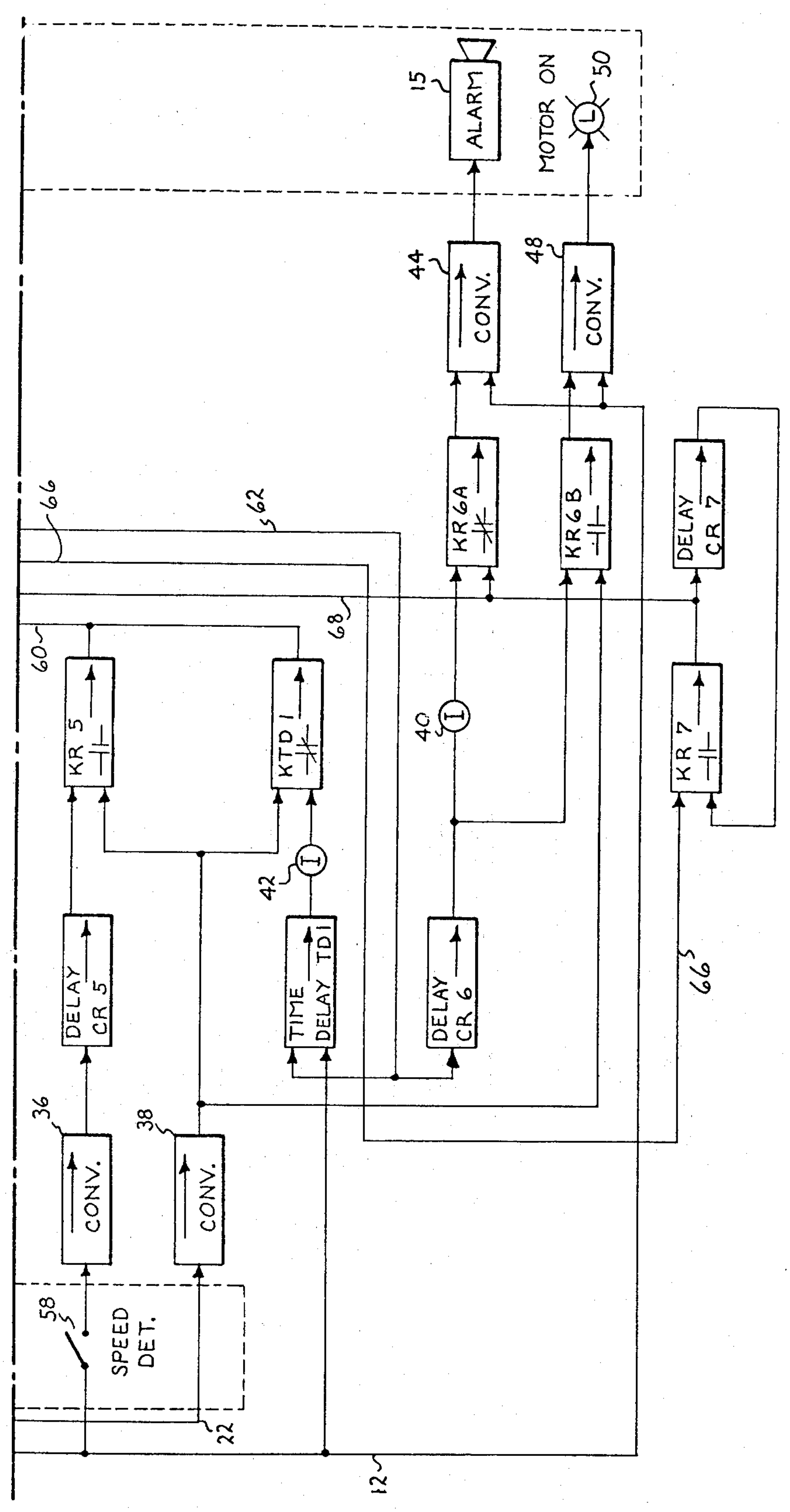

Referring now to FIGS. 1 and 2 there is illustrated, in exemplary form, a system comprising a solid-state relay logic sequence or controller 10 teaching the concepts of the invention for operating various apparatus in a process 1. The process 11 is shown on the left side of FIGS. 1 and 2 as providing input signals to the controller 10 and shown on the right side as receiving output control signals from the controller. The controller 10 is designed to start a motor 13 and turn on a "Motor On" lamp 50. Should an undesirable condition be sensed in the process 11, an alarm 15 is activated and motor 13 and lamp 50 are turned off, shutting down the process. The controller 10 also drives an events counter 17 in the process 11 to count the number of times that motor 13 has been started.

Referring back to the left side of FIGS. 1 and 2 there is shown a common AC power Bus 12 for directly providing input voltage or signals to selected circuits in the controller. The voltage from AC Bus 12 is also provided directly to two AC to DC voltage or signal converters 14 and 16 (designated as CONV.). It is significant to note that the signal on Bus 12 can also be a high level DC voltage, in which case converters 14 and 16 would be level to low level DC voltage or signal converters. Additionally, there is a DC power Bus 20 for providing direct current or low voltage level signals from converter 14 to other selected ones of the circuits in the controller 10. Converter 16 differs from converter 14 only in that it is a gated converter receiving an enable signal via a conductor 18.

The system includes a switched AC Bus 22, which also provides input voltage or signals to additional selected ones of the circuits in the controller. Like AC Bus 12, Bus 22 may also be a high voltage DC Bus.

Before proceeding further with the description of the invention it is considered advantageous at this time to provide a brief description of the various circuits contained in the logic blocks shown in the drawing.

First, it will be noted that each of the logic blocks shown in FIGS. 1 and 2 includes an arrow. The arrow in each of the blocks is used to portray the unidirectional signal flow-through characteristics of the circuits in the controller.

The controller 10 uses a plurality of input signal converter circuits (CONV.) 24 through 38 similar to converter 14 for converting either a high voltage AC or DC input signal to a low voltage DC level or logic level signal. Since converters 24 through 38 all function in a similar manner, only one of them will be described. For example, referring to converter 28, it will be noted that it receives an input signal from the AC Bus 12 via contacts 1 and 1*a* of a Man./Auto. switch SW1 when the switch is in the Man. position. When the AC signal is applied to converter 28, it generates a logic level output signal representative of a binary 1. With the AC signal removed from the input of converter 28 (SW1 in Auto. position and contact 1*a* open) its logic level output signal represents a binary 0.

The invention also uses a plurality of like delay circuits for simulating relay coils shown in blocks designated CR1 through CR7, CRAU and CRMN. Since each of the delay circuits are similar, only delay CR1 will be explained.

The nomenclature, CR1, in the block stands for the simulated coil of relay number one. Circuit CR1 may be any one of several well-known types of delay circuits. For example, it may be a transistor integrator type circuit having an RC network wihc provides a delayed output signal at some predetermined time delay interval after the application or removal of an input signal from converter 28. It is this delay function of CR1 which simulates, in a realistic fashion, the normal energization and deenergization time of a relay coil. CR1 functions to generate a binary 1 output signal in response to a binary 1 signal from converter 28 and vice versa to generate a binary 0 output signal.

It should be pointed out that each of the simulated relay coil circuits CR1 through CR7, CRAU and CRMN may possess a different time delay. This makes it possible to design simulated relay logic networks whereby the energization and deenergization times of the simulated coils may be used to design sequential relay logic.

Each of the simulated relay coils has associated with it, and forming a part thereof, one or more gating circuits such as an AND gate(s) having only two signal input terminals. These gating circuits each simulate either a normally open or a normally closed relay contact. Since each of the gating circuits are similar in operation, only those gating circuits forming a part of simulated relay coil CR6 (FIG. 2) will be explained.

Two gating circuits, designated KR6A and KR6B, have nomenclature in their respective blocks identifying them as contacts (KA) and (KB) of simulated relay coil CR6. Further, each of the blocks contains a standard symbol for a relay contact. For example, simulated contact KR6A shows a normally closed contact having a slash mark (/), whereas KR6B shows a normally open relay contact with the slash mark omitted. It is significant to an understnading of the logic circuits to realize that the normally closed and normally open condition of the simulated contacts, such as KR6A and KR6B, represent the deenergized condition of the simulated relay circuits. For example, as in the case of CR6, KR6A and KR6B, the deenergized condition exists when the input signal to cR6 is a binary 0. As such, its output terminal generates a binary 0 signal preventing simulated contact KR6B from being enabled to generate a binary 1 signal at its output terminal. An inverter 40, however, is included as a part of CR6 to cause KR6A to function as a normally closed contact. When CR6 generates a binary 0 output signal, inverter 40 responds by generating a binary 1 signal as one input to KR6A to partially enable the latter to form a normally closed simulated relay contact. That is, KR6A is enabled to generate a binary 1 output signal when it receives a second binary 1 input signal from simulated relay contact KR3C or KR7.

Normally open contact KR6B is closed to generate a binary 1 output signal when simulated coil CR6 is energized applying a binary 1 signal to KR6B in conjunction with an additional binary 1 input signal from converter 38. Simultaneously, the binary 1 signal from CR6 is inverted to a binary 0 signal through inverter 40 disabling KR6A, thus opening the normally closed simulated contact.

From the immediately preceding description it can be seen that the logic circuits of the invention truly simulate and duplicate relay logic on a one to one basis. That is, in the example given, CR6 simulates a relay coil possessing predetermined time delay characteristics, gating circuit KR6A in conjunction with inverter 40 simulates a normally closed contact and KR6B simulates a normally open contact.

It is significant to note that the state of the output signal from CR6 represents the condition of the relay (energized or deenergized) and that the state of this output signal partially enables one of the gating circuits to simulate a normally closed contact and disables the other gating circuit to simulate a normally open contact. As such, gating circuits KR6A and KR6B may be selectively enabled by the output signals of CR6 to pass complementary binary 1 and 0 output signals in response to other binary 1 and 0 signals, such as from circuits KR3C and converter 38 respectively.

Reference is now made to simulated relay coil CR3, which has an output terminal connected as ont input to each of a plurality of associated normally open simulated relay contacts KR3A, KR3B and KR3C. KR3A through KR3C are representative examples of how it is possible to form an infinite number of simulated relay contacts on one simulated relay coil by connecting the output of CR3 in parallel to the gating circuits. From observation, it is quite foreseeable how any number of normally closed simulated contacts could also be formed by merely connecting an inverter, like inverter 40, between the output terminal of CR3 and one of the input terminals of additional gating circuits like those of KR3A through KR3C.

It is possible to series connect a plurality of associated simulated relay contacts. This is shown, in exemplary form, where the output termianl of KR3B is connected as one input to KR3C.

Reference is now made to a time delay circuit TD1 in FIG. 2. Time delay TD1 may be of a common variety of several types. For example, it may be of the type which is adapted to receive an enable input signal via a conductor 62, as from the output terminal of a simulated relay contact KR2 and receive an AC input signal from AC Bus 12 to count a number of events such as the frequency of the signal on the AC Bus. After TD1 has counted a predetermined number of events, it generates a binary 1 output signal. This latter signal is inverted to a binary 0 signal through an inverter 42 and applied to a simulated relay contact KTD1. KTD1 forms a part of time delay TD1 and also receives, as a second input signal, a DC or logic level signal via converter 38. As shown in FIG. 2, KTD1 is simulative of a normally closed relay contact. As such, simulated contact KTD1 does not open until the time delay TD1 has counted a predetermined number of events, at which time a binary 0 signal from inverter 42 disables KTD1 causing its output terminal to generate a binary 0 signal and simulating the opening of a relay contact.

The present inventiom may also use output signal converter circuits for converting logic level signals back to AC signals or high voltage level DC signals for application to the process 11 to drive various electrical and electronic loads. This is exemplified in FIG. 2 by referencing a converter 44. When converter 44 receives a binary 1 input signal from KR6A it is enabled to pass the AC signal from Bus 12 to turn on the alarm 15. In a similar fashion, a converter 48 is utilized to turn on the "Motor On" lamp 50 when it receives a binary 1 signal from KR6B.

With the preceding description in mind, the operation of the invention will now be explained.

The operation will first be explained with switch SW1 in the Man. position and switch SW2 in the OFF position with power applied to AC Bus 12. This will be done to establish the various voltage and signal conditions of the circuits in the system prior to starting the process 11.

Next, the operation will be explained with SW1 in the Man. position and SW2 in the START (STR.) and RUN positions respectively. A speed detector switch 58, forming a part of motor 13, is used to detect for the proper operating speed of the motor. This portion of the operational description will deal first with the motor 13 operating at its proper speed. Then it will deal with the affect that switch 58 has on the system when motor 13 fails to operate at its normal speed.

Also, an emergency stop (EMER. STOP) switch 56 in the process 14 may be depressed at any time by an operation to shut down the process. The effect of this switch on the system will follow the above description.

Finally, the process 11, via the controller 10, can operate in the automatic mode. This operation will be described with SW1 in the AUTO. position and SW2 in the RUN position.

Assume that switch SW1 is in the Man. position as (FIG. 1) with contacts 1 and 1*a* closed and that switch SW2 is in the OFF position isolating the AC Bus 12 fromm the input terminals of converters 30 and 32 via switch contacts 2*d* and 2*e*.

Now assume that power is applied to the AC Bus 12 via the closure of a switch not shown. This application of power causes several events to take place simultaneously as follows:

1. Power from AC Bus 12 is applied to converter circuit 14 which generates a DC voltage representative of a binary 1 logic level signal on DC Bus 20.

2. DC Bus 20 in turn applies the binary 1 signal to one of the input terminals of each of the simulated contacts KR1 and KR3A partially enabling the logic circuits.

3. AC power is applied to the input terminal of signal converter 28 via the closed contacts 1 and 1*a* of SW1. Converter 28 responsively provides a binary 1 output signal to the input terminal of CR1, thus activating the simulated coil and closing the normally open contact KR1. As a result KR1 generates a binary 1 output signal, which is applied as a partial enable signal to one input terminal of simulated normally open contact KR2. KR2 is presently disabled generating a binary 0 disable signal as one input to KR4 because SW2 is in the OFF position.

4. AC power from Bus 12 is applied to the input terminal of converter 34 via an EMER. STOP switch 56. Converter 34 in turn generates a binary 1 output signal to activate simulated coil CR4. The output terminal of CR4 applies a partial enable binary 1 signal to the other input terminal of KR4.

5. AC power from Bus 12 is applied to one input terminal of time delay TD1. TD1 is disabled, however, due to the binary 0 signal provided to its outer input terminal from KR2.

6. Converters 44 and 46 are both receiving AC power from Bus 12. However, suffice to say at this time, both converters are disabled due to binary 0 signals being provided thereto by KR6A and KR6B.

7. As mentioned in 3 above, KR4 is disabled, thus applying a binary 0 disable signal, via coductor 18, to converter 16. With converter 16 disabled AC power from Bus 12 is prevented from passing through the converter to a motor start relay coil 52 in a motor starter circuit 54. With relay coil 52 deenergized, associated contacts SA and SB are in the open condition as shown in the drawing of FIG. 1. As such, no AC power is applied to motor 13 and switched AC Bus 22.

Reference is now made to switch SW2, which is used to start the motor 13 and process 11. Switch SW2 operates similar to the automatic spring return type ignition switches used in automobiles. This is, SW2 is normally momentarily switched from the OFF position to the START position, and then released, at which time it automatically springs to the RUN position.

To start the motor 13, switch SW2 is momentarily placed in the START (STR.) position. Contacts 2, 2*a*, 2*d* and 2*b*, 2*c* and 2*e* close applying power from Bus 12 to converters 30 and 32 which in turn apply a binary 1 signal to the input terminals of CR2 and CR3 respectively. After a predetermined time delay the output terminal of CR2 applies a binary 1 signal to the other input terminal of KR2 enabling the latter and closing the simulated contact to apply a binary 1 enable or energizing signal to one of the input terminals of each of the circuits KR4, KR3C, time delay counter TD1 and the input terminal of CR6.

KR4 is now enabled applying a binary 1 signal to converter 16 via conductor 18. Converter 16 now passes energizing current from Bus 12 to starter solenoid 52. Solenoid 52 energized, closing contacts SA and SB and applying power to Bus 22 and motor 13, starting the latter.

CR3, after a predetermined time delay, also generates a binary 1 signal, which is applied to one of the input terminals of each of its associated simulated contacts KR3A, KR3B and KR3C. KR3A and KR3C are both enabled at this time. As a result, KR3A applies a binary 1 signal, via a conductor 66, to one input terminal of KR7. KR3C applies a binary 1 signal to KR6A and CR7 via a conductor 68.

Reference is now made to the simulated relay CR7, KR7 which is a latch-up or remember circuit for storing the fact that the motor 13 is energized. The binary 1 signal presently applied to the input terminal of CR7 from KR3C causes CR7 to generate a binary 1 output signal. The output signal from CR7 is applied as one input to KR7 which is now enabled due to the binary 1 signal applied at its other input terminal from KR3A. With KR7 enabled, the binary 1 signal from its output terminal keeps simulated coil CR7 energized, thus keeping the simulated relay CR7, KR7 in the latched-up state. The binary 1 signal from KR7 is now applied to one input terminal of KR6A via conductor 68, keeping a partial enable signal on the one input to KR6A should KR3C be disabled at some latter time.

With switched AC Bus 22 now energized, power is applied to converter 38 which applies a binary 1 signal to one of the input terminals of each of the simulated contacts KR6B, KTD1 and KR5.

Reference is now made back to the output terminal of KR2 which is applying a binary 1 enable signal, via conductor 62, to TD1. TD1 is now enabled and counting the frequency of the AC signal on BUS 12.

CR6, also receiving the binary 1 signal on conductor 62, responds by applying a binary 1 signal to one of the input terminals of KR6B. The normally open simulated contact KR6B is now closed applying a binary 1 enable signal as one input to converter 48. Converter 48 passes the AC signal from Bus 12 to the "Motor On" lamp 50, turning on the latter and indicating to the operator of the process that power is applied to motor 13.

As previously pointed out, KTD1 is simulative of a normally closed contact. As such, KTD1 is presently enabled generating a binary 1 signal on a conductor 60 as one input to KR3B. Since CR3 is generating a binary 1 signal KR3B is enabled. It will be noted that the output terminals of KR3B and KR2 are connected together at a junction 64, thus the output signal from KR3B is also applied to one input terminal of KR4, the enable input terminal of TD1 and the input terminal of CR6. The purpose of this connection is explained as follows:

When the "Motor On" lamp 50 comes on, the operator is free to release SW2, allowing the switch to spring from the START to the RUN position. When SW2 returns to the RUN position, its contact 2 opens removing the AC signal to the input of converter 30. As a result, a binary 0 disable signal is provided to the input of KR2 via its associated simulated coil CR2. Simultaneously, however, contacts 2*b*, 2*c* and 2*e* of SW2 remain closed, thus allowing delay CR3 to continue generating a binary 1 output signal keeping KR3A through KR3C in the enabled condition. Of significance at this time, is to note that KR2 is disabled; however, the presence of a binary 1 signal at the output terminal of KR3B continues to keep CR6 energized to maintain lamp 50 on via KR6B and converter 48. Also, TD1 is maintained in the enabled condition and KR4 is kept enabled to allow motor 13 to continue running.

Attention is now given to a normally open speed detector switch 58 forming a part of motor 13. Switch 58 may be any one of several types of speed detector switches, such as the centrifugal type. assume that motor 13 achieves its proper operating speed within a predetermined time after the applicator of power. Switch 58, therefore, closes applying AC power to the input terminal of converter 36. Converter 36 responds by applying a binary 1 signal to CR5 which, after a predetermined delay, applies a binary 1 enable input signal to KR5 causing its output to generate a binary 1 signal.

Reference is now made back to TD1, which is continuing to count the frequency of the AC line from Bus 12. As previously mentioned, TD1 applies a binary 0 signal to inverter 42 until TD1 has counted a predetermined number of events. When the predetermined number of events have been counted, TD1 generates a binary 1 output signal which is inverted in a binary 0 signal through inverter 42. The binary 0 signal from inverter 42 in turn disables KTD1. However, the binary 1 signal on conductor 60 does not change because KR5 is presently enabled. As a result, KR3B continues to remain enabled applying a binary 1 enable signal to KR4 and CR6 keeping the motor 15 energized and lamp 50 turned on.

Let it now be assumed that the motor 13 has not achieved its proper operating speed within a predetermined time and that the operator has released SW2 allowing the switch to spring from the START to the RUN position. As a result, SPEED DET. switch 58 remains open isolating the AC signal on BUS 12 from converter 36. Converter 36 is, therefore, generating a binary 0 signal which is propagated through CR5 to one input terminal of KR5 disabling the latter. As previously explained, after a predetermined number of events have been counted, TD1 generates a binary 1 signal causing inverter 42 to apply a binary 0 disable signal to KTD1. As a result, KR5 and KTD1 are both disabled, generating a binary 0 signal on conductor 60. The binary 0 signal on conductor 60 disables KR3B. KR3B in turn generates a binary 0 output signal disabling KR4 and KR3C and deenergizing CR6.

KR4 responds to the binary 0 signal from KR3B by generating a binary 0 output signal on conductor 18 disabling converter 16 and removing AC power from the start solenoid 52. As a result, the contact SA and SB open removing power from Bus 22 turning off the motor 13. The binary 0 signal causes CR6 to apply a binary 0 signal to inverter 40 and KR6B, disabling the latter and turning off lamp 50 via converter 48. Inverter 40 now applies a binary 1 signal to one of the input terminals of KR6A. KR6A is also receiving a binary 1 input signal from simulated contact KR7. As a result KR6A generates a binary 1 output signal which is applied as an enable input signal to converter 44 allowing the AC signal from Bus 12 to pass therethrough activating the alarm 15.

If motor 13 has been running for sometime and for some reason, such as an overload, the motor speed drops below normal, switch 58 will open. Switch 58 opens, the motor 15 and lamp 50 will be turned off and the alarm 15 will be turned on in the same manner as just described; i.e., when the motor 13, does not come up to operating speed when first energized.

The operation of the system will now be described with the motor 13 running at proper speed with SW1 and SW2 in the Man. and RUN positions respectively while the EMER. STOP switch 86 is depressed or open.

As shown in FIG. 1, the AC signal from Bus 12 is applied to converter 34 through switch 56. When switch 56 is depressed the AC signal is removed from the input of converter 34. As a result a binary 0 signal is applied to CR4 causing the latter to generate a binary 0 signal as one input to KR4. KR4, is, therefore, disabled generating a binary 0 disabled signal via conductor 18 to the input converter 16. In response, converter 16 removes the AC signal from the starter solenoid 52 causing contacts SA and SB to open turning off motor 13 and removing AC power from Bus 22.

Removal of the AC power from Bus 22 causes the output signal of the converter 38 to achieve a binary 0 state disabling KR6B. KR6B in turn generates a binary 0 output signal disabling converter 48 and extinguishing the "Motor On" lamp 50. Also, the binary 0 signal from converter 38 is applied to simulated relay contacts KR5 and KTD1 disabling the latter two. A binary 0 output signal is thus generated from KR5 and KTD1 on conductor 60 disabling KR3B. KR3B in turn generates a binary 0 disable signal to KR3C.

Referring first to the output terminal of KR3B, it will be noted that it now applies a complete disable signal to KR4, thus preventing motor 13 from restarting when the EMER. STOP switch 56 is allowed to return to the closed position. KR3B also applies a binary 0 disable signal to TD1, preparing the latter to count events in a subsequent start cycle. Simulated relay coil CR6 is also deenergized by the binary 0 signal from KR3B which applies a binary 1 enable signal to KR6A via inverter 40. As a result, KR6A generates a binary 1 output signal enabling converter 44 to pass the AC signal to sound the alarm 15.

Reference is now made to SW1 of FIG. 1. The AC signal is applied to contacts 1*b* and 1*e* of SW1 via the switched AC Bus 22. When SW1 is in an AUTO. position, contact 1*c* is open and contacts 1*d* and 1*e* are closed applying the AC signal to a converter 24. When SW1 is in the Man. position, contact 1*d* is open and AC power is applied to a converter 26 via closed series connected contacts 1*b* and 1*c*.

In the AUTO. position of SW1, the output of converter 24 applies a binary 1 signal to a delay CRAU, standing for Simulated Coil Automatic Relay, which in turn applies a binary 1 signal to a logic block designated AUTO. LOGIC.

When SW1 is placed in the Man. position, converter 26 applies a binary 1 signal to a delay CRMN (Simulated Coil Manual Relay) which applies a binary 1 signal to a logic block designated MAN. Logic.

Additionally, as shown in FIG. 1, the AUTO. LOGIC block receives signals from the process via a multiconductor signal input cable. The MAN. LOGIC block similarly receives a multiconductor signal input cable for receiving operator signals from the process. The AUTO./MAN. LOGIC blocks selectively provide output signals to control the process in either AUTO. or MAN. mode in accordance with the switch position of SW2.

The AUTO./MAN. LOGIC blocks are shown to indicate how a controller, such as controller 10, may be connected into a system for controlling a process.

It is readily foreseeable from the preceding description of the invention how the circuits of the controller 10 may be interconnected in various prescribed configurations in the AUTO./MAN. LOGIC blocks to expand the capability of the controller by forming additional simulated relay logic for generating signal to control a process in response to various signals provided thereto from the process.

Reference is now made to FIG. 1 to the output terminal of KR3B, which is connected to an events counter 17. The events counter 17 may be used for many purposes, however, as illustrated, it registers a number representative of the number of times that motor 13 has been started or the number of times that the motor start solenoid 52 has been energized. This number may be used by an operator or maintenance man, for example, to indicate to him that preventative maintenance must be performed on the motor or on the start solenoid at predetermined intervals. It is quite obvious, however, the the output signal from KR3B may be utilized to cause activation of a number of events to take place within the process. For example, it may be used to activate or energize a solenoid in the process to cause some event to happen in the process of starting or controlling the equipment.

While the principles of the invention have now been made clear in an illustrative embodiments, there will be immediately obvious to those skilled in the art many modifications of structure, arrangement, the elements, materials, and components used in the practice of the invention and otherwise, which are particularly adapted for specific environments and operating requirements without departing from those principles. The appended claims are, therefore, intended to cover and embrace any such modifications within the limits only of the true spirit and scope of the invention.

What is claimed is:

1. A method of simulating relay logic systems using solid-state logic circuits having unidirectional signal flow-through characteristics wherein the circuits directly replace and simulate, on a one to one basis, relay coils and contacts, comprising the steps of:

- *a.* generating a delayed signal simulative of the energization of a relay coil in response to a first signal applied to a delay circuit;
- *b* generating second and third signals;
- *c.* applying said second and third signals to first and second gating circuits respectively in conjunction with said delayed signal;
- *d.* generating complementary output signals from said first and second gating circuits simulative of the operation of relay contacts; and
- *e.* applying, in cascade, said complementary output signals to additional delay circuits and to additional first and second gating circuits to generate further signals simulative of the operation of relay coils and contacts, respectively.

2. A method of simultating relay logic systems using solid-state logic circuits having unidirectional signal flow-through characteristics wherein the circuits directly replace and simulate, on a one to one basis, relay coils and contacts, comprising the steps of:

- *a.* generating a delayed signal simultative of the energization of a relay coil in repsonse to a first signal applied to a delay circuit;
- *b.* generating second and third signals;
- *c.* applying, simultaneously, said delayed signal to first and second logic circuits, said second signal to said first logic circuit and said third signal to said second logic circuit to generate complementary output signals from said first and second logic circuits simulative of the operation of relay contacts;
- *d.* applying one of said complementary output signals to an electrical load circuit to effect a predetermined action by said load circuit; and
- *e.* applying, in cascade, another one of said complementary output signals to additional delay circuits and additional first and second logic circuits to generate further output signals simulative of the operation of relay coils and contacts respectively.

3. Solid-state logic circuits having unidirectional signal flow-through characteristics, each responsive to a plurality of applied signals to selectively generate other signals, for simulating relay coils and contacts in solid-state logic systems by the cascading of said logic circuits, the combination comprising:

- *a.* a plurality of delay circuits, each simulative of a relay coil, and each adapted to generate a delayed output signal in response to a corresponding one of the applied signals;
- *b.* a plurality of pairs of AND gates, each pair associated with a one of said delay circuits, each AND gate simulative of a relay contact, and each AND gate having first and second input terminals and an output terminal for generating a one of the other signals;
- *c.* first connecting means connecting the delayed output signal of each of said delay circuits to the first input terminal of an AND gate of an associated pair;
- *d.* means, including an inverter, connecting the output terminal of each of said delay circuits to the first input terminal of the other AND gate of its associated pair;
- *e.* second connecting means connecting the output terminal of each of a plurality of pairs of additional ones of said AND gates to the second input terminals of a corresponding one of each of the AND gates of each of said plurality of pairs of AND gates; and
- *f.* third connecting means connecting the output terminal of each AND gate of said plurality of pairs of AND gates, in cascade, to the first input terminal of other ones of said plurality of pairs of AND gates to develop further simulated relay contacts.

4. Solid-state logic circuits, each responsive to the plurality of applied signals to selectively generate other signals, for simulating relay coils and contacts in solid-state logic systems by the cascading of said logic circuits, the combination comprising:

- *a.* first and second logic circuits, each simulative of the operation of a relay, each of said logic circuits including;
  - *i.* a delay circuit, simulative of a relay coil, adapted to generate a delayed output signal in response to a first one of the applied signals;
  - *ii.* a gating circuit, simulative of a relay contact, having first and second input terminals and an output terminal;

*iii. first connecting means connecting the delayed output signal of said delay circuit to the first input terminal of said gating circuit;*

*b.* third connecting means connecting an additional signal to the second input terminal of said gating circuit of said first logic circuit to effect the generation of a one of the other signals at the output terminal of said latter gating circuit in response to the delayed output signal of said delay circuit of said first logic circuit and the additional signal; and

*c.* second connecting means connecting the output terminal of said gating circuit of said girst logic circuit to the second input terminal of said gating circuit of said second logic circuit to effect the generation of another one of the other signals at the output terminal of said latter gating circuit in response to the delayed output signal of said delay circuit of said second logic circuit and the one of the other signals.

5. Solid-state logic circuits having unidirectional signal flow-through characteristics, each responsive to a plurality of applied signals to selectively generatively generate other signals, for simulating relay coils and contacts in solid-state logic systems by the cascading of said logic circuits, the combination comprising:

*a.* first and second logic circuits each simulative of the operation of a relay, each of said logic circuits including;

*i.* a delay circuit, simulative of a relay coil, adapted to generate a delayed output signal in response to a one of the applied signals;

*ii.* first and second gating circuits, simulative of normally open and normally closed rlay contacts respectively, each having first and second inputs terminals and each having an output terminal for generating a one of the other signals;

*iii.* first connecting means connecting the delayed output signal of said delay circuit to the first input terminal of said first gating circuit;

*iv.* second connecting means, including an inverter, connecting the delayed output signal of said delay circuit to the first input terminal of said second gating circuit;

*b.* third connecting means connecting the output terminal of said first gating circuit of said first logic circuit to the second input terminal of a one of said first and second gating circuits of said second logic circuit;

*c.* fourth connecting means connecting the output terminal of said second gating circuit of said first logic circuit to the second input terminal of the other one of said first and second gating circuits of said second logic circuit; and

*d.* means individually associated with the second input terminal of each of said first and second gating circuits of said first logic circuit for connecting thereto additional ones of the applied signals.

6. Solid-state logic circuits, each responsive to a plurality of applied signals to selectively generate other signals, for simulating relay coils and contacts in solid-state logic systems by the cascading of said logic circuits, the combination comprising:

*a.* a first logic circuit, including;

*i.* a first delay circuit, simulative of a relay coil, responsive to a first one of the applied signals representative of a number of events to be counted, for generating a first delayed output signal after a predetermined number of counted events;

*ii.* a first gating circuit, simulative of a normally closed relay contact, having a first input terminal for receiving the first delayed output signal, a second input terminal for receiving a second one of the applied signals, said first gate circuit responsive to the first delayed output signal and the second one of the applied signals to generate a one of the other signals simulative of an open relay contact at an output terminal thereof after the predetermined number of counted events;

*b.* a second logic circuit, including;

*i.* a second delay circuit, simulative of a relay coil, responsive to a third one of the applied signals representative of a detected condition for generating a second delayed output signal at a predetermined time after the application thereto of the third one of the applied signals;

*ii* a second gating circuit, simulative of a normally open relay contact, having a first input terminal for receiving the second delayed output signal, and a second input terminal for receiving the second one of the applied signal, said second gating circuit responsive to the second delayed output signal and the second one of the applied signals to generate another one of the other signals simulative of a closed relay contact at an output terminal thereof at the predetermined time; and

*c.* connecting means connecting together the output terminals of said first and second gating circuits, whereby the other signals from the output terminals of said first and second gating circuits form a common final signal on said connecting means representative of a predetermined time relationship between the first and second delayed output signals.

7. In a solid-state relay logic system wherein logic circuits, simulative of relay coils and contacts, are interconnected to construct a system of the type for statically monitoring high voltage level and low voltage level input signals and sequentially generating output signals in response to the input signals, the improvement in said logic system comprising:

*a.* a plurality of converter circuits, each responsive to a one of the high voltage level input signals for generating a corresponding logic level signal;

*b.* a plurality of logic circuits, each simulative of the operation of a relay, said logic circuits each associated with a one of said plurality of converter circuits, said logic circuits each including;

*i.* a delay circuit, simulative of a relay coil, responsive to a logic level signal from an associated one of said converter circuits for generating a delayed signal;

*ii.* first and second gating circuits, simulative of normally open and normally closed contacts respectively, each having first and second input terminals and an output terminal for providing a one of the output signals;

*iii.* means connecting the delayed signal from said delay circuit to the first input terminal of said first gating circuit;

*iv.* means including an inverter, connecting the delayed signal from said delay circuit to the first input terminal of said second gating circuit;

c. means associated with each of said first and second gating circuits for connecting a selected one of the low voltage level input signals to the second input terminals thereof; and d. means for connecting the output terminal of selected ones of said first and second gating circuits of selected ones of said plurality of logic circuits to the delay circuit and to the first and second gating circuits of additional ones of said plurality of logic circuits to form additional simulated relay coils and contacts respectively.

8. The solid-state relay logic system as recited in claim 7 further comprising, a plurality of low voltage level to high voltage level converter circuits, each generating a high voltage level output signal in response to the output signal from a corresponding one of said first and second circuits of said plurality of logic circuits.

* * * * *